US005361887A

United States Patent [19]

Zaharia et al.

[11] Patent Number: 5,361,887

[45] Date of Patent: Nov. 8, 1994

[54] APPARATUS FOR DETECTING AN IRREGULARITY IN THE FREQUENCY OF STEPS PASSING A PARTICULAR POINT WITHIN A PASSENGER CONVEYING DEVICE

[75] Inventors: Vlad Zaharia, Rocky Hill, Conn.; Arthur McClement, Bloomington, Ind.

[73] Assignee: Otis Elevator Company, Farmington, Conn.

[21] Appl. No.: 213,337

[22] Filed: Mar. 14, 1994

[51] Int. Cl.$^5$ ........ B65G 43/00

[52] U.S. Cl. ........ 198/323

[58] Field of Search ........ 198/322, 323

[56] References Cited

U.S. PATENT DOCUMENTS

| | | | |
|---|---|---|---|
| 3,580,376 | 5/1971 | Loshbough | 198/323 |
| 4,629,052 | 12/1986 | Kitamura et al. | 198/323 |
| 4,800,998 | 1/1989 | Myrick | 198/323 |
| 4,863,006 | 9/1989 | Kotkata et al. | 198/323 |
| 5,096,040 | 3/1992 | Wente et al. | 198/323 |
| 5,107,975 | 4/1992 | Iwata | 198/323 |

FOREIGN PATENT DOCUMENTS

| | | | |
|---|---|---|---|
| 0082074 | 6/1993 | European Pat. Off. | B66B 9/12 |
| 53-140788 | 12/1978 | Japan | B66B 9/12 |
| 54-159988 | 12/1979 | Japan | B61B 13/14 |
| 93-6410 | 9/1993 | Rep. of Korea | B66B 29/00 |
| 850541 | 7/1981 | U.S.S.R. | B66B 9/12 |
| 1500609 | 8/1989 | U.S.S.R. | |

OTHER PUBLICATIONS

U.S. patent application Ser. No. 07/981,699 filed Nov. 25, 1992 entitled "Escalator Missing Step Detection" assigned to Otis Elevator Co.

Proximity Sensors–North American Edtion 1993–Pepperl & Fuchs, pp. 4–9, 160 & 161.

*Primary Examiner*—James R. Bidwell

[57] ABSTRACT

An apparatus for detecting an irregularity in the frequency of steps passing a particular point within a passenger conveying device is provided, comprising an apparatus for sensing the presence of an axle attached to the step without contacting the axle or a roller attached thereto.

15 Claims, 3 Drawing Sheets

APPARATUS FOR DETECTING AN IRREGULARITY IN THE FREQUENCY OF STEPS PASSING A PARTICULAR POINT WITHIN A PASSENGER CONVEYING DEVICE

BACKGROUND OF THE INVENTION

Technical Field

This invention pertains to passenger conveying devices in general, and in particular to devices for sensing a missing step or an irregular step motion in a passenger conveying device.

Background Art

Escalators, moving walkways, and other people moving devices efficiently move a large volume of pedestrian traffic from one point to another. Passengers step on moving steps (or belts, or pallets) and are transported along the length of the device from a first landing to a second landing at a constant rate of speed.

The steps are attached to a step chain that travels in a closed loop between the landings. The steps file out of the first landing and travel exposed from the first landing to the second landing. After entering the second landing, the steps reverse direction and return to the first landing concealed within the frame of the device. Finally, the steps reverse direction within the first landing, and thereby complete the closed loop.

A person of skill in the art will recognize the need to sense a step that has broken partially or completely away from the step chain, known in the art as a "missing step." An unsupported or misaligned step poses a serious safety hazard for passengers. Moreover, serious mechanical damage to the passenger conveying device could result from a step not properly positioned.

There are several known ways to detect a missing step. Some approaches advocate using gravity and an electromechanical switch. When the step swings away from the chain in the return path, the out of position step triggers the electromechanical switch as it passes by. A disadvantage of this method is that a switch may be damaged by a step that is grossly out of position. Another disadvantage of using an electromechanical switch is that electromechanical switches are prone to wear.

Another approach is to pass a photoelectric beam through holes in the steps. In an out of position step, the holes do not align with the light beam. Consequently, the controller is flagged to stop the passenger conveying device. A disadvantage of this approach is that the step must be altered to provide a through path for the light beam. This type of missing step detector can not be retrofit, therefore, onto existing passenger conveying devices absent alteration of the steps. Another disadvantage of this approach is that it is sensitive to dirt and debris typically found in a passenger conveyor environment.

Still another approach is to use a proximity sensor to sense the presence of the top face of each step. A disadvantage of this approach is that it requires the step path to include a segment in the return portion where the top faces of the steps are aligned in a linear fashion. A further disadvantage of this approach is that it requires steps having linear side surfaces for sensing. Still another disadvantage of this approach, is that it requires a metallic step top face. In instances where the edge of the top face has been machined to accept a plastic safety insert, there is less metal for the sensor to detect.

A person of skill in the art will also recognize that safety considerations also require a passenger conveying device to include a means for sensing irregular step motion. For example, safety considerations require that the return movement of an upwardly moving step must be prevented. Safety considerations further require that overspeed conditions be detected as well.

SUMMARY OF THE INVENTION

An object of the present invention is to provide an apparatus for detecting a missing step in a passenger conveying device that does not depend upon the geometry of the step path.

Another object of the present invention is to provide an apparatus for detecting a missing step in a passenger conveying device that may be used at any position along the return path of the steps.

Still another object of the present invention is to provide an apparatus for detecting a missing step in a passenger conveying device that may be used with a nonmetallic step.

Still another object of the present invention is to provide an apparatus for detecting a missing step in a passenger conveying device that may be used with steps having nonmetallic inserts positioned along the edges of the steps.

Still another object of the present invention is to provide an apparatus for detecting a missing step in a passenger conveying device that may be easily retrofitted on existing passenger conveying devices.

Still another object of the present invention is to provide an apparatus capable of sensing a change in the velocity of steps traveling within a passenger conveying device.

According to the present invention, an apparatus for detecting an irregularity in the frequency of steps passing a particular point within a passenger conveying device is provided, comprising means for sensing the presence of a roller axle without contacting the roller or the axle.

According to one embodiment of the present invention, the apparatus for detecting an irregularity in the frequency of steps passing a particular point further comprises means for comparing the amount of time transpiring between sensing a first and second roller axle and a preset value range. If the amount of time transpiring between sensing the first and second roller axles is lesser or greater than the preset value range, then the apparatus changes state and thereby flags the passenger conveying device to stop.

According to another embodiment of the present invention, the presence of a roller axle causes the sensing means to either change from a first state to a second state, or to remain in the second state. In a normal condition, the amount of time transpiring between the operations of the sensing means is greater than the amount of time transpiring between the sensing of the presence of two roller axles. In an irregular condition, the amount of time transpiring between the sensing of the presence of two roller axles is greater than the amount of time transpiring between one period of the operations of the sensing means, thereby causing the sensing means to change from the second state to the first state.

An advantage of the present invention is that it can be used to detect missing steps as well as irregular step motion in passenger conveying device. A person of skill in the art will recognize that it is necessary to monitor for: (1) missing steps; (2) imminent step chain direction reversals; and (3) overspeed conditions. A person of skill in the art will further recognize that it is an advantage to have one device performing all three functions, instead of three separate devices.

Another advantage of the present invention is that it does not require contact with the step to operate the apparatus, and therefore may avoid catastrophic damage to the sensor.

Still another advantage of the present invention is that it will operate in an environment containing dirt and other contaminants. A person of skill in the art will recognize that the environment within a passenger conveying device is often a harsh environment with many contaminants. It is a decided advantage, therefore, to have a sensor as impervious to contaminants as possible.

Still another advantage of the present invention is that it may be used on passenger conveying devices having nonmetallic steps.

Still another advantage of the present invention is that it may be used on passenger conveying devices having steps with nonmetallic inserts positioned along the edge of the step.

Still another advantage of the present invention is that it is positionable anywhere along the return path of the steps, and therefore does not require a linear section of path.

Still another advantage of the present invention is that it may be retrofit onto existing passenger conveying devices.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
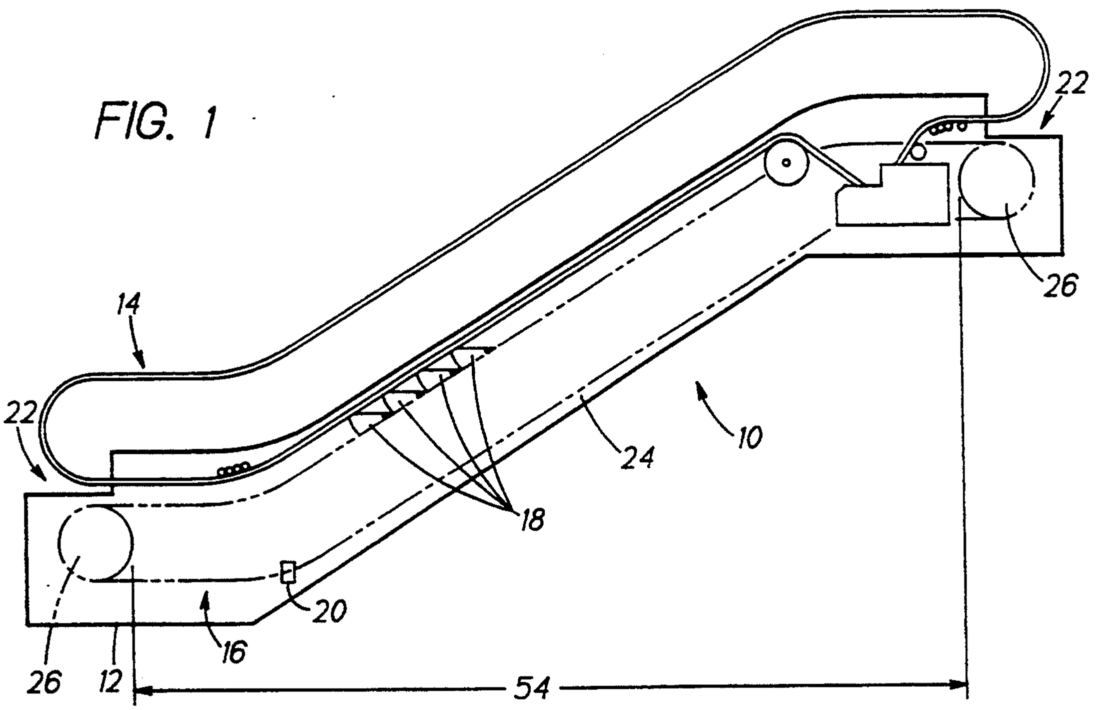
FIG. 1 is a diagrammatic view of an escalator.

Referring to FIG. 1, an escalator 10 is shown diagrammatically having a truss frame 12, a balustrade 14, a step chain 16, a plurality of steps 18, and an apparatus 20 for detecting an irregularity in the frequency of steps 18 passing a particular point within the escalator 10. Passengers (not shown) are conveyed from the entrance to the exit of the escalator 10 by the plurality of steps 18 attached to the step chain 16. The truss frame 12 includes a pair of landings 22 connected by an inclined midsection 24. Each landing 22 includes a sprocket assembly 26 for reversing the travel of the step chain 16 and attached steps 18. The step chain 16 may be described, therefore, as traveling a closed loop from one landing 22 to the other and back.

Figure 2:
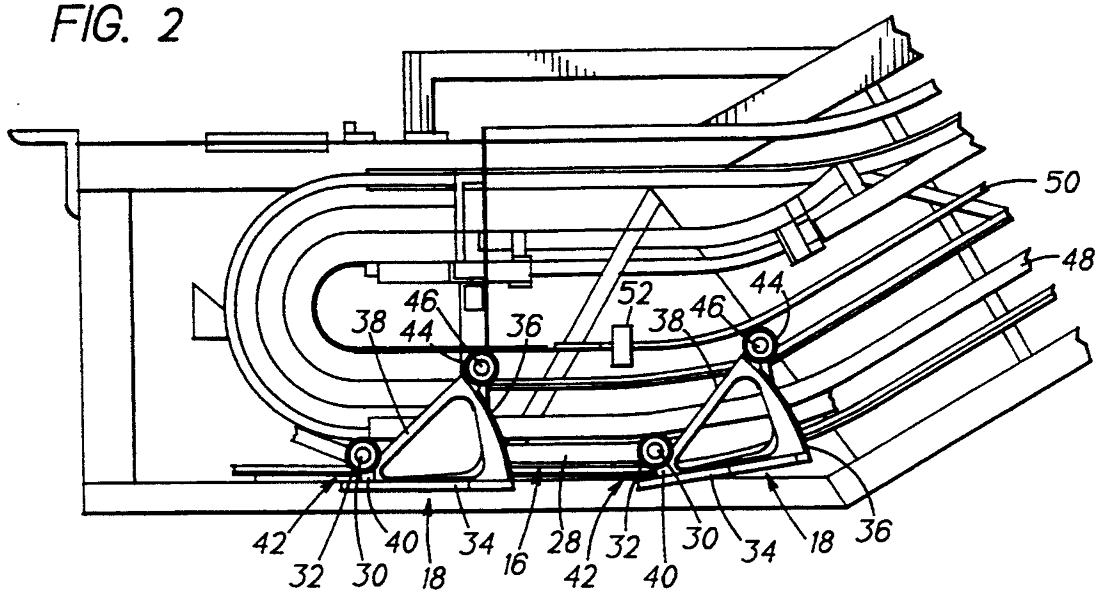
FIG. 2 is a diagrammatic view of an escalator landing, showing an apparatus for detecting an irregularity in the frequency of steps passing a particular point within the escalator.

Referring to FIG. 2, the step chain 16 comprises a pair of strands 28 (only one strand is shown in the side view of FIG. 2) connected to one another by axles 30 extending therebetween, as is known in the art. Each axle 30 include a pair of rollers 32 for carrying the load placed on the axle 30 by the step 18 attached thereto, and cumulative load transferred through the step chain 16. The steps 18 attached to the step chain axles 30 comprise a top surface 34, a leading surface 36, and a triangular shaped frame 38. Yokes 40 positioned adjacent the rear edge 42 of the step 18 pivotally attach the step 18 to the step chain axle 30. The rollers 30 attached to the step chain 16 support the rear edge 42 of the step 18, as is known in the art. A second pair of rollers, called trailer rollers 44, attached to the triangular frame 38 of the step 18 below the leading surface 36 support the front of the step 18. Trailer rollers 44 are typically attached to the step frame 38 by stub axles 46 extending out from the frame 38. The stub axles 46 are usually made from a metallic material such as hardened steel. The trailer rollers 44 may or may not include metallic hubs (not shown).

Two roller tracks 48,50 are attached to the inside of the truss frame 12 of each side of the truss frame 12, as is known in the art. The step chain roller track 48 supports and guides the step chain rollers 32 and the trailer roller track 50 supports and guides the trailer rollers 44. The geometry of these tracks 48,50 determines the circuitous path taken by the step chain 16 and attached steps 18. Track geometries differ between different rise escalators, and between escalators and moving walkways (not shown). A person of skill in the art will recognize, however, that in all cases the step chain rollers 32 or the trailer rollers 44 are held in close proximity to the tracks 48,50 either by gravity, or by guiding surfaces (not shown), or by both. Hence, the position of each roller 32,44 normally traveling the path is repeated by the step 32 or trailer 44 roller to follow.

A sensor 52 is attached to the truss frame 12 adjacent the trailer roller track 50 on each side of the truss frame 12. The sensor 52 is positioned such that trailer rollers 44 attached to steps 18 traveling in a normal position within the return portion 54 (see FIG. 1) of the step chain path pass within a field emitted by the sensor 52. Under normal conditions at least the metallic stub axle 46 is sensed. Normal conditions may be defined as: Steps traveling along the tracks, wherein each step takes substantially the same path as the step before, at substantially the same speed. In cases where a trailer roller 44 having a metallic hub is used, the roller hub may also be sensed. The sensor 52 may be positioned at any position along the return portion 54 of the trailer roller track 50.

Figure 3:
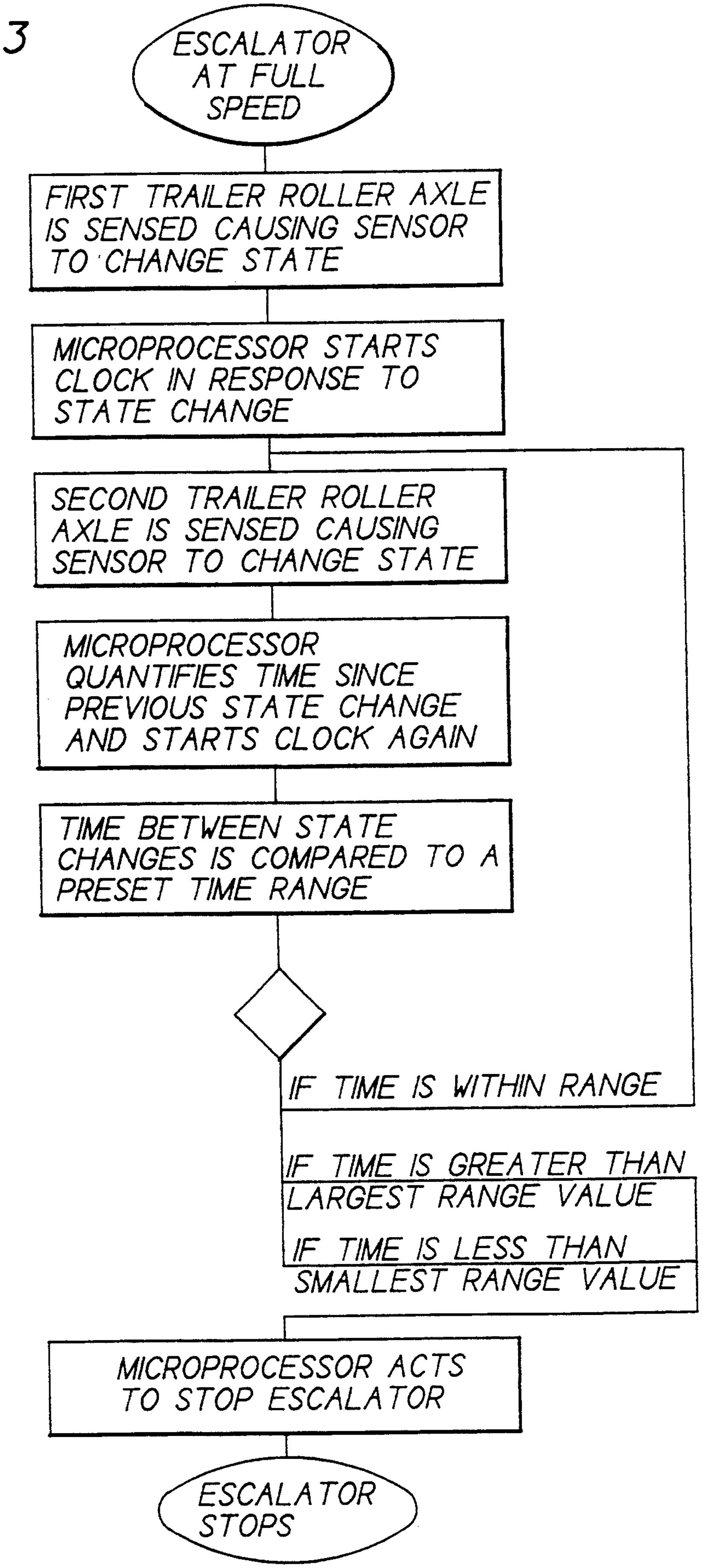
FIG. 3 is a flow chart describing the logic of the first embodiment of the invention.

Referring to FIGS. 2 and 3, in the first embodiment an inductive proximity sensor 52 is used to detect the presence of a trailer roller axle 46. The metallic trailer roller axle 46 passing through the field emitted by the sensor 52 causes the sensor 52 to change from a first state to a second state and back. The sensor's change of state is noted by a microprocessor (not shown) electrically connected to the sensor 52. An internal clock within the microprocessor quantifies the amount of time transpiring between changes of state in the sensor 52 as an actual time value.

The microprocessor compares the actual time value to a range of time values preset in the microprocessor. The range may be defined as having an upper threshold and a lower threshold. Using a time range compensates for slight speed variations in the step chain 16 due to factors such as the load on the escalator 10, the direction of travel of the escalator 10, and others. If the actual time is within the preset range, the steps 18 passing by the sensor 52 are in the correct position and traveling within the allowable speed range. If the actual time is greater than the upper threshold of the time range, either a step 18 is missing or the speed of the escalator has slowed to an unacceptable rate. A person of skill in the art will recognize that an unacceptable slow speed is an indicia of an imminent step chain direction reversal. In both cases, the microprocessor acts to stop the escalator 10. If the actual time value is less than the lower threshold of the time range, the escalator 10 is overspeeding and the microprocessor will act to stop the escalator 10.

Using an inductive proximity sensor 52 coupled with an external microprocessor provides the advantage that one sensor performs three functions. A person of skill in the art will recognize that prior art teaches the use of three separate sensors for detecting missing steps, imminent direction reversals, and overspeed conditions.

Figure 4:
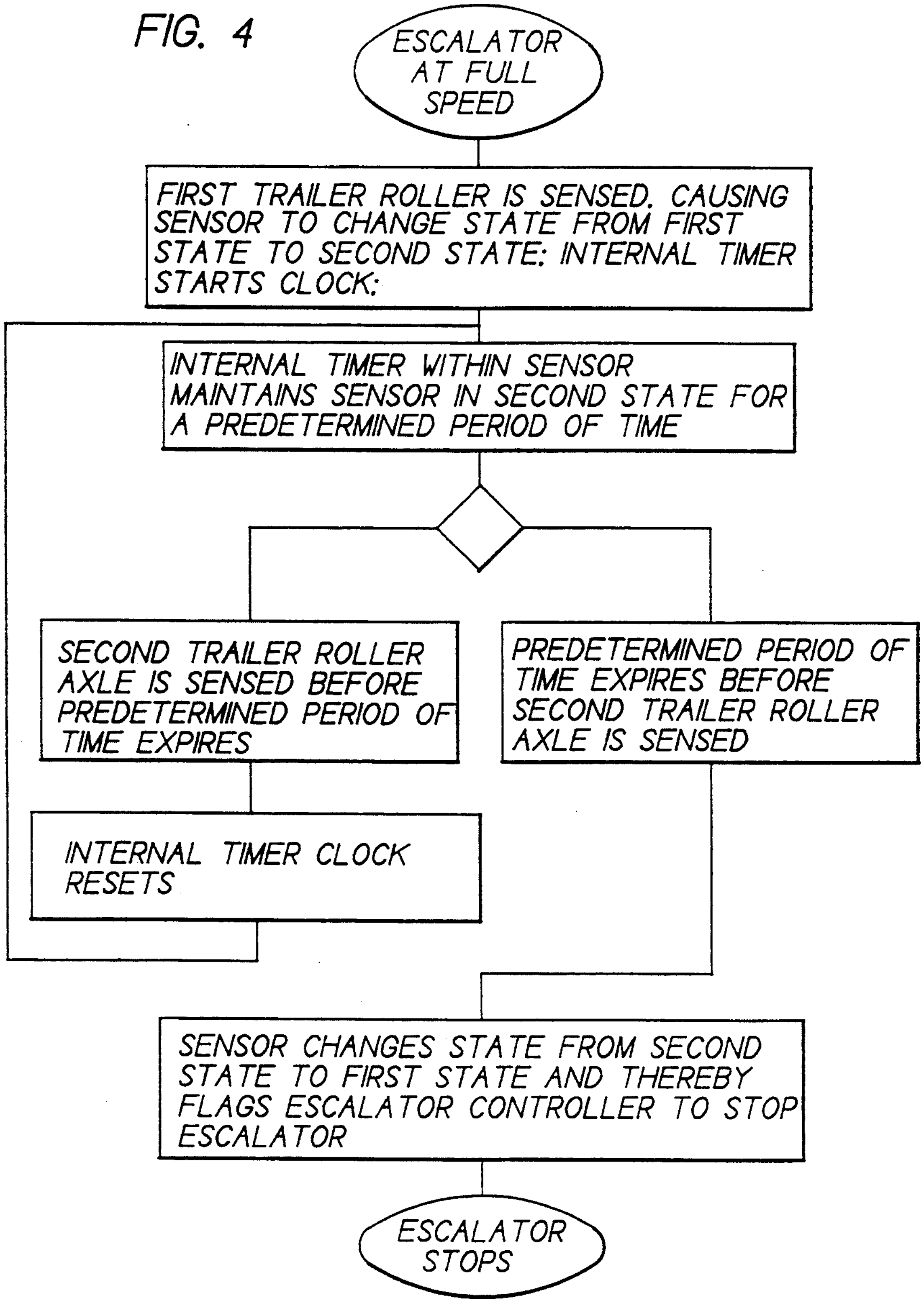
FIG. 4 is a flow chart describing the logic of the second embodiment of the invention.

Referring to FIGS. 2 and 4, in the second embodiment an inductive proximity sensor 52 having an internal timer is used. The metallic trailer roller axle 46 passing through the field emitted by the sensor 52 causes the sensor to change from a first state to a second state. The internal timer within the sensor 52 maintains the sensor in the second state for a predetermined period of time, after which the sensor 52 automatically reverts back to the first state. The predetermined period of time is greater than the amount of time it takes for two trailer roller axles 46 to be sensed by the sensor 52 when the escalator 10 is operating in a normal condition. Each time an axle 46 is sensed, the internal clock resets. Hence, in a normal condition the sensor 52 is maintained in the second state because the internal clock resets before the predetermined time has expired. If a step 18 is missing, or if the step chain 16 slows down below an acceptable speed (i.e., an imminent direction reversal), the predetermined time period will expire before a second axle 46 is sensed and the sensor 52 will change back to the first state automatically. The first state of the sensor 52 is a flag to the controller (not shown) to stop the escalator 10.

Using an inductive proximity sensor with an internal timer to sense for trailer roller axles 46 provides several advantages. One advantage is that it can be retrofit on a wide variety of escalators 10 and other passenger conveying devices. Including the timer within the sensor 52 enables the sensor 52 to give an on/off signal that by itself is sufficient to flag the controller (not shown).

Another advantage of using an inductive proximity sensor 52 with an internal timer is that it can sense imminent direction reversals. If, for example, the step chain 16 in a loaded escalator 10 operating in the incline direction were to freewheel, gravity would cause the step chain 16 and attached steps 18 to first decrease in speed and then reverse direction. An inductive proximity sensor 52 having a timer implemented in the above described manner would change state and thereby flag the escalator controller to stop the escalator 10.

Although this invention has been shown and described with respect to the detailed embodiments thereof, it will be understood by those skilled in the art that various changes in form and detail thereof may be made without departing from the spirit and scope of the claimed invention. In particular, in this best mode it has been described that inductive proximity sensors are used. A person or skill in the art will recognize that other sensors such as capacitive proximity sensors may be used alternatively.

We claim:

1. An apparatus for detecting a missing step in a passenger conveying device, comprising:

means for sensing the presence of an axle of said step, when said step travels in a return portion of a circuitous path;

means for quantifying the amount of time transpiring between the occurrence of said presences and creating a first time value corresponding to said amount of time;

means for comparing the magnitude of said first time value and the magnitude of a second predetermined time value, wherein said second predetermined time value magnitude is greater than an amount of time it takes a pair of said axles to pass said sensing means in a normal operating mode for said passenger conveying device; and means for interrupting power to said passenger conveying device if said first time value is greater than said second time value.

2. An apparatus for detecting a missing step in a passenger conveying device according to claim 1, wherein said means for sensing comprises an inductive proximity sensor capable of sensing an axle comprising a metallic material.

3. An apparatus for detecting an irregularity in the frequency of steps passing a particular point within a passenger conveying device, comprising:

means for sensing the presence of an axle of said step without physically contacting said axle, or a roller attached thereto, when said step travels in a return portion of a circuitous path;

means for quantifying the amount of time transpiring between the occurrence of said presences and creating an actual time value corresponding to said amount of time;

means for comparing the magnitude of said actual time value to a range of time values, said range having an upper threshold and a lower threshold;

wherein an amount of time it takes a pair of said axles to pass a particular point within said passenger conveying device in a normal operating mode fits within said range; and means for flagging said passenger conveying device to stop if said actual time value is greater than said upper threshold, or if said actual time value is less than said lower threshold.

4. An apparatus for detecting an irregularity in the frequency of steps passing a particular point within a passenger conveying device according to claim 3, wherein said means for sensing comprises an inductive proximity sensor capable of sensing a metallic axle.

5. An apparatus for detecting an irregularity in the frequency of steps passing a particular point within a passenger conveying device according to claim 3, wherein said axle being sensed supports a trailer roller of an escalator step.

6. An apparatus for detecting a missing step in a passenger conveying device, comprising:

means for sensing the presence of an axle of said step in a return portion of a circuitous path traveled by said step without contacting said axle or a roller attached thereto, wherein said presence of said axle causes said sensing means to one of either change from a first state to a second state, or to remain in a second state;

means for maintaining said sensing means in a second state for a predetermined period of time whereafter said sensing means automatically reverts back to said first state, wherein said maintaining means resets automatically in response to said axle presence;

wherein in a normal condition, said predetermined period of time is greater than the amount of time transpiring between the sensing of the presence of two said axles, said sensing means therefore normally remaining in said second state; and wherein in a missing step condition, the amount of time transpiring between the sensing of the presence of two axles is greater than said predetermined period of time, thereby causing said sensing means to change from said second state to said first state and thereby flagging said passenger conveyor to stop.

7. An apparatus for detecting a missing step in a passenger conveying device according to claim 6, wherein said sensing means and said maintaining means comprise an inductive proximity sensor having a time delay.

8. An apparatus for detecting an irregularity in the frequency of steps passing a particular point within a passenger conveying device, comprising:

means for sensing the presence of an axle of said step in a return portion of a circuitous path traveled by said step without contacting said axle or a roller attached thereto, wherein said presence of said axle causes said sensing means to one of either change from a first state to a second state, or to remain in a second state;

means for maintaining said sensing means in a second state for a predetermined period of time whereafter said sensing means automatically reverts back to said first state, wherein said maintaining means resets automatically in response to said axle presence;

wherein in a normal condition, said predetermined period of time is greater than the amount of time transpiring between the sensing of the presence of two said axles, said sensing means therefore normally remaining in said second state; and wherein in an irregular condition, the amount of time transpiring between the sensing of the presence of two axles is greater than said predetermined period of time, thereby causing said sensing means to change from said second state to said first state and thereby flagging said passenger conveyor to stop.

9. An apparatus for detecting an irregularity in the frequency of steps passing a particular point within a passenger conveying device, according to claim 8, wherein said sensing means and said maintaining means comprise an inductive proximity sensor having a time delay.

10. A method for detecting an irregularity in the frequency of steps passing a particular point within a passenger conveying device, comprising the steps of:

providing means for sensing for the presence of a metallic axle of said step, said sensing means having a first state and a second state, and an internal timer for maintaining said sensing means in a second state for a predetermined period of time;

sensing for the presence of said axle in a return portion of a circuitous path traveled by said step without contacting said axle or a roller attached thereto;

changing the state of said sensing means in response to said presence of said axle either from said first state to said second state, or resetting said internal timer and thereby maintaining said sensing means in said second state;

wherein in a normal condition, said predetermined period of time is greater than the amount of time transpiring between the sensing of the presence of two said axles, said sensing means therefore normally remaining in said second state; and wherein in an irregular condition, the amount of time transpiring between the sensing of the presence of two axles is greater than said predetermined period of time, thereby causing said sensing means to change from said second state to said first state and thereby flagging said passenger conveyor to stop.

11. A method for detecting an irregularity in the frequency of steps passing a particular point within a passenger conveying device according to claim 10, wherein said means for sensing comprises an inductive proximity sensor.

12. A method for detecting an irregularity in the frequency of steps passing a particular point within a passenger conveying device according to claim 11, wherein said axle supports a trailer roller of an escalator step.

13. A method for detecting an irregularity in the frequency of steps passing a particular point within a passenger conveying device, comprising the steps of:

providing means for sensing the presence of an axle of said step without physically contacting said axle or a roller attached thereto, when said step travels in a return portion of a circuitous path;

quantifying the amount of time transpiring between the occurrence of said presences and creating an actual time value corresponding to said amount of time;

comparing the magnitude of said actual time value to a range of time values, said range having an upper threshold and a lower threshold;

wherein an amount of time it takes a pair of said axles to pass a particular point within said passenger conveying device in a normal operating mode fits within said range; and flagging said passenger conveying device to stop if said actual time value is greater than said upper threshold, or if said actual time value is less than said lower threshold.

14. A method for detecting an irregularity in the frequency of steps passing a particular point within a passenger conveying device according to claim 13, wherein said means for sensing comprises an inductive proximity sensor.

15. A method for detecting an irregularity in the frequency of steps passing a particular point within a passenger conveying device according to claim 14, wherein said axle supports a trailer roller of an escalator step.

* * * * *